United States Patent [19]

Wagner

[11] 4,237,949
[45] Dec. 9, 1980

[54] ANTI-THEFT FASTENER

[76] Inventor: Laurence Wagner, 6552 Northridge Dr., San Jose, Calif. 95120

[21] Appl. No.: 948,794

[22] Filed: Oct. 5, 1978

[51] Int. Cl.³ .............................................. F16B 39/02
[52] U.S. Cl. ...................................... 151/67; 85/1.55; 85/45; 70/258
[58] Field of Search .................. 151/67, 70, 8, 23, 34; 85/1.55, 45, 6.1, 53, 35, 9 R, 32 R; 248/27.1; 70/230, 229, 258

[56] References Cited

U.S. PATENT DOCUMENTS

| | | | |
|---|---|---|---|
| 188,540 | 3/1877 | Quackenbush | 85/45 X |
| 461,523 | 10/1891 | Phelps | 85/53 X |
| 522,287 | 7/1894 | Brown | 151/67 |
| 1,599,068 | 9/1926 | Swope | 151/8 X |
| 1,940,455 | 12/1933 | Kilpela | 151/70 X |
| 2,770,998 | 11/1956 | Schwartz | 85/45 |
| 2,836,451 | 5/1958 | Clifton | 85/1.55 X |
| 3,222,976 | 12/1965 | Holman | 85/35 X |

FOREIGN PATENT DOCUMENTS

543109  5/1922  France ........................................ 151/34

*Primary Examiner*—Ramon S. Britts
*Attorney, Agent, or Firm*—Jack M. Wiseman

[57] ABSTRACT

An attachment fastener is provided in the form of a threaded bolt having a head. Radially displaced axial holes in the head are provided with set screws which, when installed, are recessed within the head and project into an adjacent support arm or to a member to which the bolt is attached. Thus, removal of the bolt requires the prior removal of at least one set screw in order for the bolt to be rotated.

2 Claims, 7 Drawing Figures

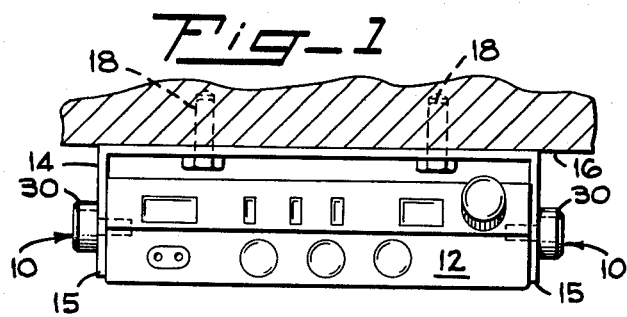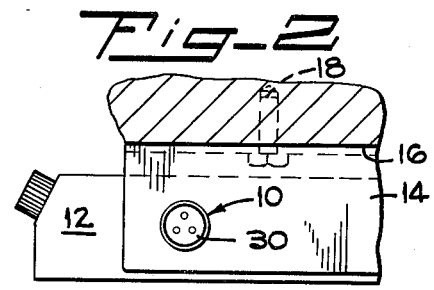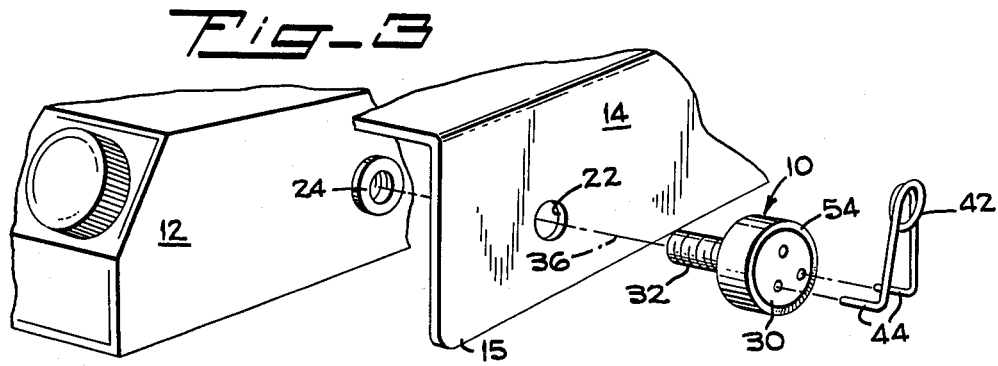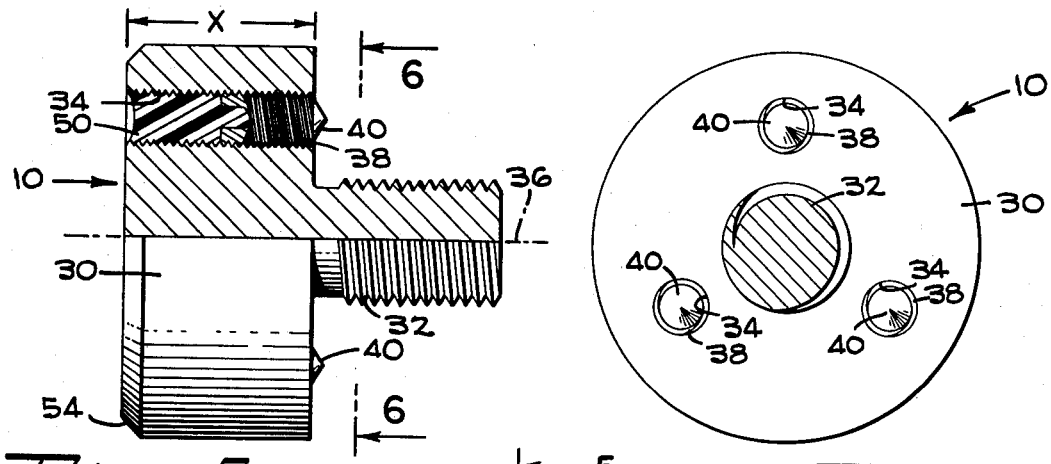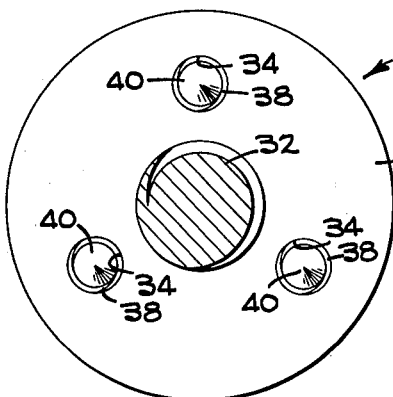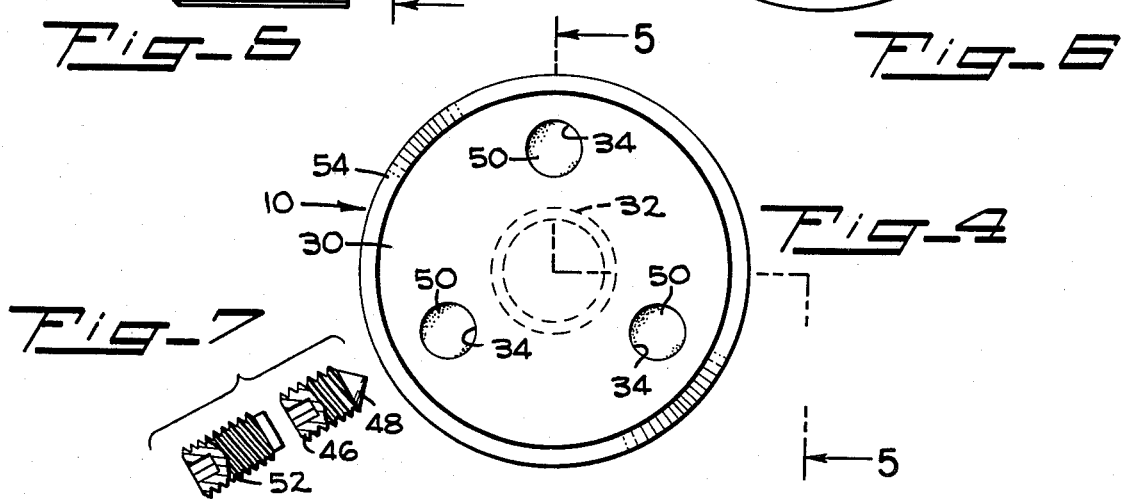

ANTI-THEFT FASTENER

BACKGROUND OF THE INVENTION

The present invention relates in general to threaded fasteners, and more particularly to a threaded fastener suitable for inhibiting the theft of a product secured to a mounting member.

The present invention is useful in attaching to a mounting arrangement a stereo tape deck, radio, or other valuable automobile accessory devices, which devices are commonly the target of thieves. For example, the present invention may positively secure equipment of any kind which must be protected against unauthorized tampering. While not intended to completely thwart thievery or tampering, the present invention will so long delay any intruder that he will clearly face the imminent risk of discovery and must neccessarily cease his activity.

Prior art devices of the general type above described include a one-way slotted head in which driving surfaces allow the device to be tightened with a screwdriver, but integral camming surfaces will eject the screwdriver blade if the device is turned in the loosening direction. Another type of fastener is provided with a head having either end surface spanner wrench holes or circumferential grooves so that a special tool must be used to install or remove the same.

SUMMARY OF THE INVENTION

The anti-theft fastener of the present invention includes a threaded shank having a suitable head. Preferably, the head is of cylindrical form and is case hardened to inhibit gripping thereof with toothed pliers. At least one threaded hole is provided in the head for acepting a spanner wrench to install the fastener, and for mounting at least one set screw which projects from the underside of the head, when the fastener is installed. Thus, at least one set screw projects into a mounting arm or flange of the equipment which is being protectively attached by the anti-theft fastener.

BRIEF DESCRIPTION OF THE DRAWINGS

FIG. 1 is a front elevation of a vehicle-mounted radio accessory.

FIG. 2 is a fragmentary side elevation of the apparatus shown in FIG. 1.

FIG. 3 is an exploded isometric view of a portion of the apparatus shown in FIG. 1, and including the anti-theft fastener of the present invention.

FIG. 4 is an enlarged end elevation of the anti-theft fastener.

FIG. 5 is a side elevation, partly in section, taken along lines 5—5 on FIG. 4.

FIG. 6 is a section taken along lines 6—6 on FIG. 5.

FIG. 7 is an elevation of two aligned set screws.

DESCRIPTION OF THE PREFERRED EMBODIMENT

With reference to FIGS. 1 and 2, one example of the utility of the anti-theft fastener 10 of the present invention is illustrated in conjunction with the attachment of a radio accessory 12, such as a transceiver or a stereo radio, to a car or truck. This type of attachment or mounting commonly includes an inverted, generally U-shaped bracket 14, having vertical flanges 15, which is permanently affixed to a support surface 16 by bolts 18 that are substantially inaccessible after the installation is completed. The bracket 14, in turn, is connected to the radio accessory 12, for relative pivotal movement, by laterally aligned bolts which allow the radio accessory to be tilted to the convenience of the driver.

For the latter purpose, each vertical flange 15 of the bracket 14 is provided with an aperture, one of which is located at 22 in FIG. 3. A conventional bolt, not shown, installed through said aperture and threaded into a boss 24 on the side of the radio accessory 12, plus a complementary convention bolt, not shown, in the opposite flange fasten the radio accessory to the bracket. However, conventional bolts can be readily removed, and the relatively high value of the accessory makes it an attractive target for thieves.

According to the present invention, such thievery is made infinitely more difficult and hazardous by replacing the conventional mounting bolts with the anti-theft fastener 10. Now referring to FIGS. 4 and 5, the fastener 10 is in the form of a bolt having an integral, suitable head 30 and a threaded shank 32 which is adapted to engage the threads of the boss 24 (FIG. 3). In the examplary embodiment, the head 30 has a cylindrical configuration. One or more threaded aperatures 34, parallel to the turning axis 36 of the shank 32 and radially displaced therefrom, extend completely through the cylindrical head 30. Each of the latter apertures is arranged to receive a set screw 38 (FIG. 5) which is preferably provided with a cone-point 40 for forming its own seating recess when the fastener 10 is installed. The set screws 38 penetrate the vertical flanges 15 in securing engagement therewith.

Thus, referring to FIG. 3, the radio accessory 12 is connected to the vertical flanges 15 by threading the shank 32 of the fastener 10 into the boss 24. In order to tighten the fastener, a simple spring wire spanner wrench 42 having two legs 44 is positioned with the legs seated in the set screw apertures 34 (no set screws are yet installed in said apertures). Then, the spanner wrench 42 is turned to rotate the fastener 10 so that the underside of the cylindrical head 30 seats firmly against the flange 15.

After removing the spanner wrench 42, one of the set screws 38 is threaded into each aperture 34 until its cone point 40 deforms and projects into the flange 15. As an alternative construction, each cone point set screw 38 may be replaced by a set screw with a half dog point. In the illustration shown in FIG. 7, the point 48 of a set screw 46 is conical and it is essential that the flange 15 be drilled to provide recesses, not shown, which will allow the points 48 to seat within the drilled holes.

As thus far described, it will be apparent that when the fastener 10 is installed as described, there is no possibility of turning the fastener to remove the same, unless the set screws 38 are first removed. Thus, a further deterrent to quick removal of the fastener 10 is to fill each set screw aperture 34 with a hardening compound such as a suitable lacquer (shown at 50 in FIG. 5) so that it is impossible to gain access to the socket or slot in the head of the set screw without first removing the compound. A further deterrent may be provided by mounting a second set screw 52 (FIG. 7) over each of the first set screws, provided that the thickness of the fastener head 30 will allow the second set screw to be recessed therein after the installation is completed.

As is well known in the fastener art, there are numerous different types of driving means for commerically available set screws. Accordingly, in contrast to the hex-socket type of set screw illustrated, a thief may be further thwarted by employing, for example, a spline socket set screw in combination with a different type of set screw. In other words, two different set screw removal tools will be required after the hardened compound is cleared away to gain access to the first set screw, and even then a special spanner wrench is necessary to turn the fastener 10. In this regard, it is preferable that the fastener head 30 is case hardened so that toothed gripping tools, such as pliers, cannot readily grip the head.

It is also considered to be within the scope of the present invention that the head 30 may be either very thin (axially) or radically beveled, or even hemispherical and/or hardened to more positively assure that the head cannot be easily gripped to turn the fastener. However, in the present example, the head thickness X (FIG. 5) may approximate only 3/16 of an inch, or less, if only one set screw is used in each set screw aperture. Further, the outer circumferential edge at 54 (FIGS. 4 and 5) may additionally be beveled, the total result of which is that there is no way a thief expecting minimal anti-theft precautions will be willing to prolong his potential discovery for the time necessary to defeat the anti-theft fastener 10.

It should be noted that the specific utility of the anti-theft fastener 10 requires that only one set screw aperture be provided, but in such case, a wrench (not shown) in the form of a cylindrical socket with an internal pin to engage the set screw hole will be required in lieu of the spanner wrench 42 which requires at least two apertures. Finally, it should also be noted that the utility of the anti-theft fastener 10 is not limited to the particular environment described and illustrated. It will be apparent that an equipment access panel or door may be afforded similar anti-theft or anti-tampering protection by employing a plurality of peripherally mounted fasteners to so long delay entry that an intruder will not accept the risk.

It is to be noted that the inventive concept is equally applicable to a nut or other like fastener as a safety, as well as anti-theft, device. Such a nut would have an internally threaded body with at least one threaded set screw aperture extending therethrough parallel to and radially displaced from the turning axis of the head. A set screw is disposed in the aperture to engage the adjacent mounting surface that is associated with the nut.

I claim:

1. An anti-theft fastener comprising:
 (a) a bolt head having a head, said head having a cylindrical external periphery and being provided with at least two circumferentially spaced threaded apertures extending therethrough parallel to and radially displaced from the turning axis of said bolt to define spanner engaging drive means, said head being a hardened head;
 (b) a pair of set screws threaded into each of said threaded apertures, one of said set screws projecting from one side of said head at installation of said fastener, and the other of said set screws having its driving end recessed in said head and spaced from the other side of said head; and
 (c) a hardening compound in each of said apertures over the driving end of said other set screws.

2. An anti-theft fastener comprising:
 (a) a bolt head having a head, said head having a cylindrical external periphery and being provided with at least two circumferentially spaced threaded apertures extending therethrough parallel to and radially displaced from the turning axis of said bolt to define spanner engaging drive means, said head being a hardened head;
 (b) a plurality of set screws threaded into each of said threaded apertures, one of said set screws projecting from one side of said head at installation of said fastener, and another of said set screws having its driving end recessed in said head and spaced from the other side of said head; and
 (c) a hardening compound in said apertures over the driving end of said other set screw.

* * * * *